United States Patent [19]
Hiramatsu

[11] Patent Number: 5,984,223
[45] Date of Patent: Nov. 16, 1999

[54] SEAT BELT RETRACTOR AND ITS SPOOL

[75] Inventor: Koji Hiramatsu, Tokyo, Japan

[73] Assignee: Takata Corporation, Tokyo, Japan

[21] Appl. No.: 09/179,591

[22] Filed: Oct. 27, 1998

[30] Foreign Application Priority Data

Jun. 5, 1998 [JP] Japan ............................... H10-157783

[51] Int. Cl.$^6$ ................................................. B65H 75/48
[52] U.S. Cl. ...................... 242/379.1; 242/374; 242/376; 280/805; 297/480
[58] Field of Search .................................. 242/374, 376, 242/379.1; 280/805, 806; 297/480

[56] References Cited

U.S. PATENT DOCUMENTS

| | | | |
|---|---|---|---|
| 4,119,281 | 10/1978 | Paitula et al. .............................. | 242/376 |
| 4,254,921 | 3/1981 | Adomeit ..................................... | 242/376 |
| 4,322,046 | 3/1982 | Tanaka et al. ............................ | 280/805 |
| 4,623,104 | 11/1986 | Mori .......................................... | 242/376 |
| 5,511,739 | 4/1996 | Dybro et al. ............................ | 242/379.1 |
| 5,547,143 | 8/1996 | Miller, III et al. .................... | 242/379.1 |
| 5,613,647 | 3/1997 | Dybro et al. .............................. | 242/376 |
| 5,626,306 | 5/1997 | Miller, III et al. .................... | 242/379.1 |
| 5,630,561 | 5/1997 | Ogawa et al. ............................ | 242/376 |
| 5,671,894 | 9/1997 | Dybro et al. .............................. | 242/374 |
| 5,820,056 | 10/1998 | Dybro et al. .............................. | 242/374 |
| 5,836,534 | 11/1998 | Bohmler ................................. | 242/379.1 |

*Primary Examiner*—Donald P. Walsh
*Assistant Examiner*—William A. Rivera
*Attorney, Agent, or Firm*—Kanesaka & Takeuchi

[57] ABSTRACT

In a spool, a torsion bar is inserted into an inner hole formed in the spool. The spool has a first slit and a second slit which extend in parallel with each other along the chord direction in the cross section perpendicular to the axis of the inner hole. The end of the webbing is passed through these slits. The end of the webbing is folded back and sewn together to form a loop and a webbing stopper is inserted into the loop made by folding and sewing. The end of the webbing with the webbing stopper engages the second slit.

7 Claims, 11 Drawing Sheets

SEAT BELT RETRACTOR AND ITS SPOOL

FIELD OF THE INVENTION

The present invention relates to a spool of a seat belt retractor used in a vehicle including a motor vehicle, and in particular to a spool of a seat belt retractor incorporating a torsion bar. Further, the present invention relates to a seat belt retractor having the spool. Furthermore, the present invention relates to a seat belt retractor having a mechanism to restrict the upper limit of the torsional revolution of the torsion bar.

BACKGROUND OF THE INVENTION

One of conventional seat belt retractors has a spool and a torsion bar inserted into an inner hole of the spool. One end of the torsion bar is fixed to the spool and the other end of the torsion bar is engageable with a retractor frame by a clutch mechanism. In an emergency such as collision, the other end of the torsion bar is locked by the clutch mechanism to the frame. As the one end of the torsion bar is fixed to the spool, the torsion bar is twisted by the force which is exerted in the webbing-unwinding direction to the spool, resulting in the gradual rotation of the spool and the gradual unwinding of the webbing. In this way, a part of the kinetic energy delivered to the body of an occupant is absorbed by the twisting of the torsion bar, and the impact is alleviated.

One of examples of seat belt retractors having such a torsion bar (JUB 61-11085) is shown in FIGS. 5 through 8.

In FIG. 5 and FIG. 6 a retractor body 1 is fixed to the vehicle by inserting a bolt into a hole 11 formed in the frame thereof.

A pair of side walls 12, 13 are formed in the frame 1 and a spool 2 is journaled rotatably on the walls. The spool 2 is formed in a cylindrical shape to have an inner hole in which a torsion bar 3 is disposed.

The torsion bar 3 comprises a bar-like torsional portion 31, a joint 32 formed on one end of the torsional portion 31 for connecting to the spool 2, a threaded portion 33 which has a larger diameter than the torsional portion 31 and is provided with a thread 331 formed in its outer surface, and a gear portion 34 on the end of the threaded portion 33. The gear portion 34 comprises a flange-like circular plate 341 and saw-teeth-like one way ratchet teeth 342 on the outer periphery of the circular plate 341. The torsional portion 31 is arranged in the inner hole of the spool 2 coaxially with it. The joint 32 having a rectangular head is fitted into a rectangular hole formed in the wall 21 at one end of the spool 2 Accordingly, the joint 32 which is located at the one end of the torsion bar 3 rotates together with the spool 2. A ring 35 is fitted on the outer periphery of the threaded portion 33 to confront the inner surface of the spool 2 in such a manner that it can slide against the spool 2.

Formed on one end of the spool 2 is a flange 22, one face of which is sidably disposed to the side wall 13 of the retractor body 1 and the other face confronting the plate 341 of the gear portion 34 with a certain space between them has a plurality of projections 23, which have rectangular cross sections.

A ring-like stopper member 4 having female thread on its inner periphery is screwed on the threaded potion 33 of the torsion bar 3 in such a manner that it can easily rotate. Holes 41 are formed in the stopper member 4, at the positions corresponding to the projections 23, and the projections 23 are inserted loosely into the holes 41.

One end of a webbing S is connected to the torsional portion 31 of the torsion bar 3. The webbing S is wound on the spool 2 then introduced out of the spool, and the unwound end is fixed to an anchor or a buckle (not shown). A casing 14 is arranged on the side of the side wall 12 of the retractor body 1. The casing 14 has a spiral spring (not shown) which biases lightly the spool 2 in the webbing-winding direction (the direction indicated by an arrow $Y_1$ in FIG. 6). The webbing S can be unwound in accordance with the posture of the occupant (the direction indicated by an arrow $Y_2$ in FIG. 6).

Fixed on the lower ends of both side walls 12, 13 is a bracket 15 movably supporting the pendulum 5. A ratchet 6 is supported on the upper end of the pendulum 5 in such a manner that the ratchet is inclined to be lifted by the movement of the pendulum 5. The lifted ratchet 6 engages its one end with the confronting tooth of the one way ratchet teeth 342 of the torsion bar 3 to lock the rotation of one end of the torsion bar 3.

In the seat belt retractor mentioned above, the torsion bar 3 is usually not locked by the ratchet 6, and the torsion bar 3 and the spool 2 are rotatable, thereby allowing the unwinding and winding of the webbing S in accordance with the posture of the occupant.

When the vehicle comes in collision, the pendulum 5 sways to lift the ratchet 6, as shown in FIG. 7 and FIG. 8. The ratchet 6 therefore engages one of the ratchet teeth 342 of the gear portion 34 of the torsion bar 3 to lock the rotation in the webbing-unwinding direction (the direction indicated by the arrow $Y_2$ in FIG. 8).

On the other hand, webbing S is tensioned by the movement of the occupant body, causing the rotation of the spool 2 in the webbing-unwinding direction. In this instant, if the rotational force exceeds the stress limit of the torsional portion 31 of the torsion bar 3, the spool 2 rotates with twisting the torsional portion 31. In this way, the impact energy to the occupant is absorbed.

When the spool 2 rotates, the stopper member 4 which is engaged with the projections 23 arranged in one end of the spool 2 also rotates. As the stopper member 4 is screwed rotatably onto the threaded portion 33 of the torsion bar 3, and is fitted loosely with the projections 23 of the spool 2, the stopper member 4 is driven toward the plate 341 which has teeth formed in the outer periphery. After the spool 2 has rotated and the torsional portion 31 of the torsion bar 3 has been twisted for a predetermined angle within which it does not break, the stopper member 4 comes in contact with the plate 341 and thus, the rotation of the spool 2 is stopped. Consequently, the torsion bar 3 is prevented from breaking even if the excess load is exerted from the occupant to the webbing S.

However, it is difficult to fix the end of the webbing firmly onto the spool which has torsion bar inserted in its inner hole as mentioned above. In addition, the JUB 61-11085 has no description as to how the webbing S is fixed onto the spool 2.

In the example shown in FIG. 5 through FIG. 8, the stopper member 4 is arranged outside of the flange 22. Accordingly, the seat belt retractor protrudes toward the side of the frame for the total length of the thickness of the stopper member 4 and its stroke along the projections 23.

OBJECT AND SUMMARY OF THE INVENTION

It is an object of the present invention to facilitate the fixing of a webbing firmly to a spool having an inner hole into which a torsion bar is inserted.

It is another object of the present invention to make the seat belt retractor more compact by removing such a protrusion as mentioned above.

A spool for winding a webbing of a seat belt retractor of a first aspect has a cylindrical portion provided with an inner hole into which a torsion bar is inserted. The cylindrical portion is provided with a plurality of slits extending along a chord direction in the cross section perpendicular to the axis of the cylindrical portion so that the webbing is fixed to the spool by passing an end of the webbing through the slits. The number of the slits may be two and said slits are disposed in parallel with each other in said section.

A seat belt retractor of a second aspect is a seat belt retractor which has a torsion bar inserted in the spool and utilizes the spool of the aforementioned type.

In the spool of the seat belt retractor, the webbing can be passed through a plurality of slits. The end of the webbing can have, for example, a stopper which is engaged with the entrance of the slit, thus making it possible to fix the webbing firmly onto the spool. In this way, the concentration of the outer force to the connecting point of the webbing to the spool can be avoided because the webbing is passed through the plurality of slits.

A seat belt retractor of a third aspect comprises a cylindrical spool for winding a webbing, a frame supporting said spool, a torsion bar which is inserted into an inner hole of said spool and fixed to the spool at one end thereof, and a locking means for locking the other end of said torsion bar when acceleration exceeding a predetermined value is sensed. The torsion bar twists when tensile force exceeding a predetermined value is exerted to the webbing at a state in which the locking means has locked the other end of the torsion bar. The locking means has a pawl holder which is locked to the frame when the acceleration exceeding the predetermined value is sensed, a column which projects from the pawl holder and is inserted into the inner hole of said spool, a male thread which is formed in the outer surface of the column, and a stopper member having a female thread formed in the inner surface thereof which is screwed on the male thread. The stopper member is sidable back and forth in axial direction along said column. The locking means further has a plurality of projections which project from said stopper member in the direction including the radial direction, and recesses which are formed in the inner hole of said spool and with which said projections are engaged. The stopper member is driven toward said pawl holder when the locking means has operated and the torsion bar twists by the tensile force exceeding the predetermined value exerted to the webbing and, after that, the stopper member comes in contact with the pawl holder, thereby transmitting the torque of the spool to the pawl holder via the stopper member and stopping the further rotation of the spool.

The seat belt retractor of the present invention has the protrusion toward the outside of the frame which is smaller than that of the conventional example of FIG. 5 through FIG. 8, because the stopper member is arranged within the inner hole of the spool, thereby making the seat belt retractor more compact.

DESCRIPTION OF PREFERRED EMBODIMENTS

Figure 1A:
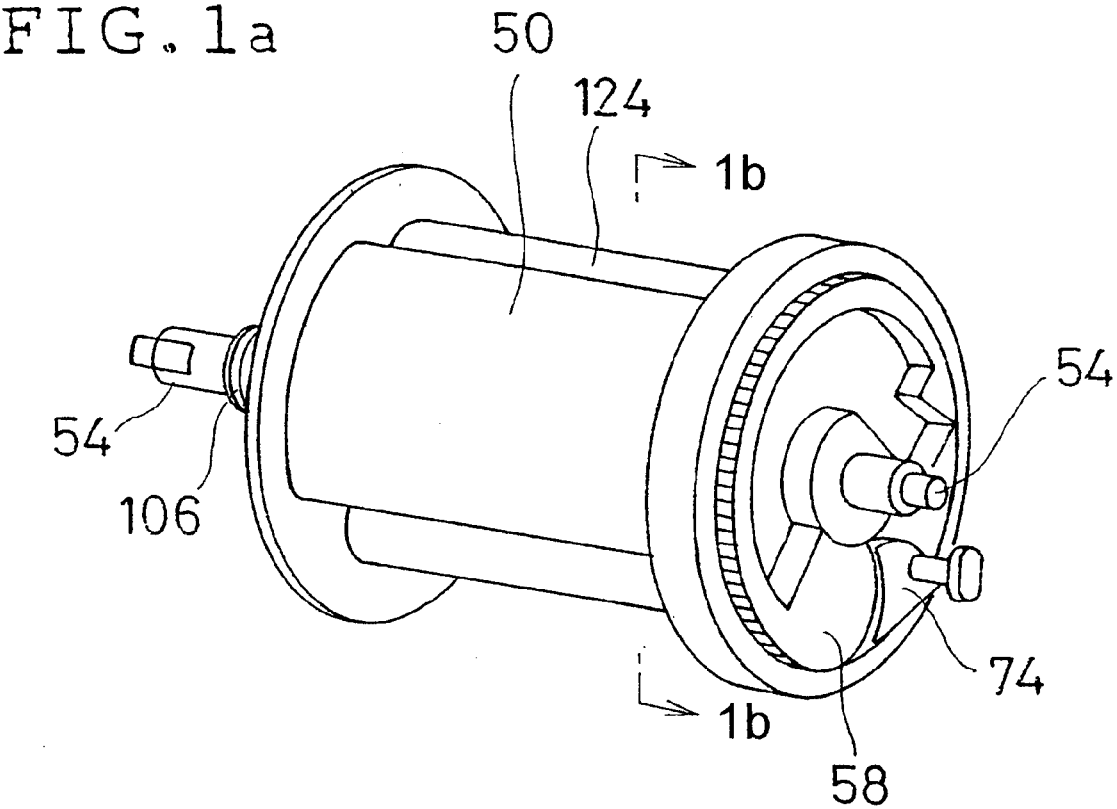
FIGS. 1a and 1b are structural views of a spool according to an embodiment of the present invention.
Figure 1B:
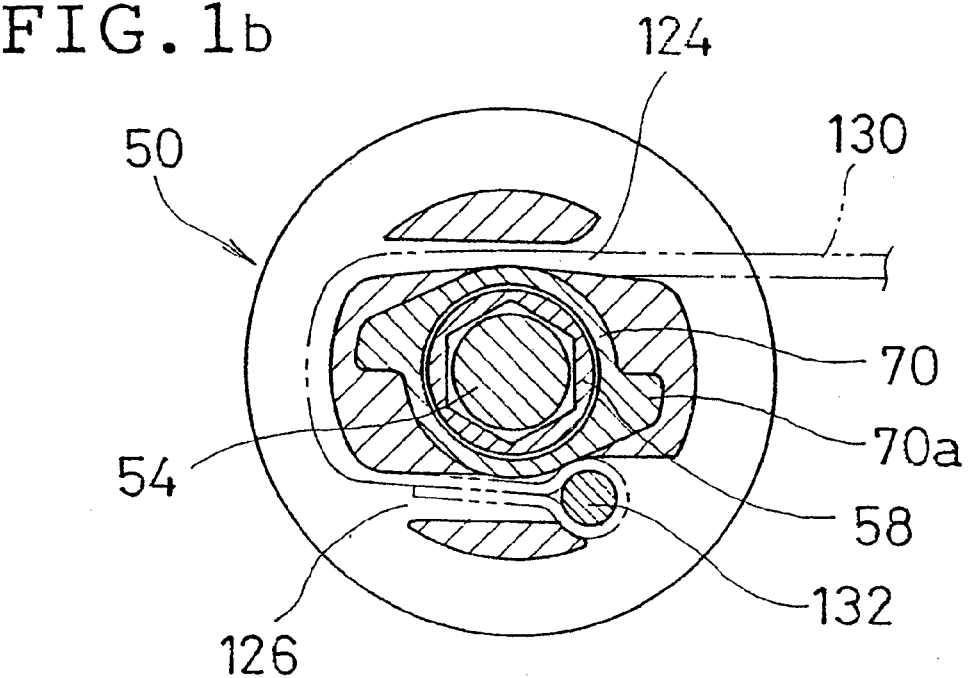
Figure 2:
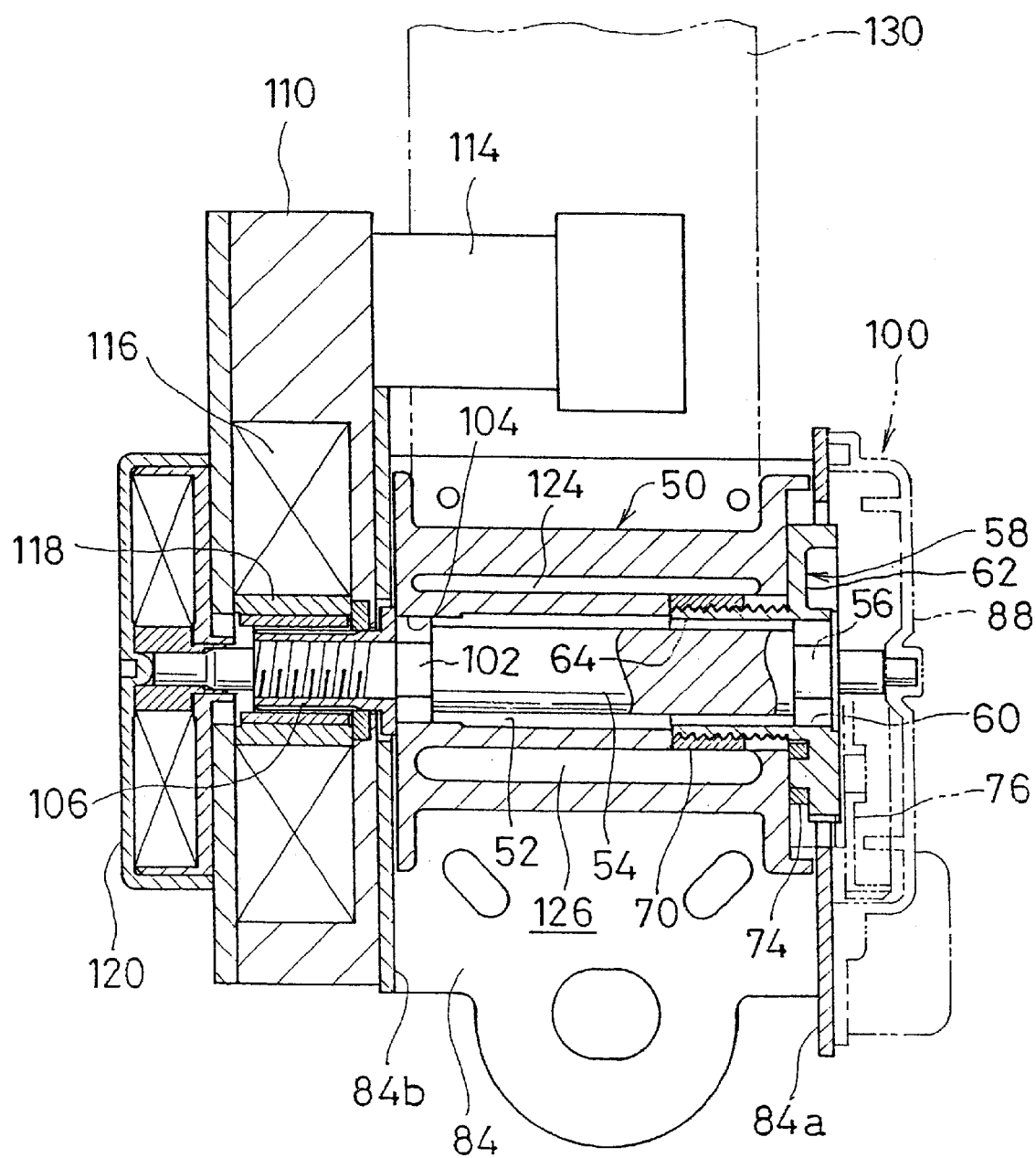
FIG. 2 is a vertical sectional view of a seat belt retractor having the spool according to the embodiment.
Figure 3:
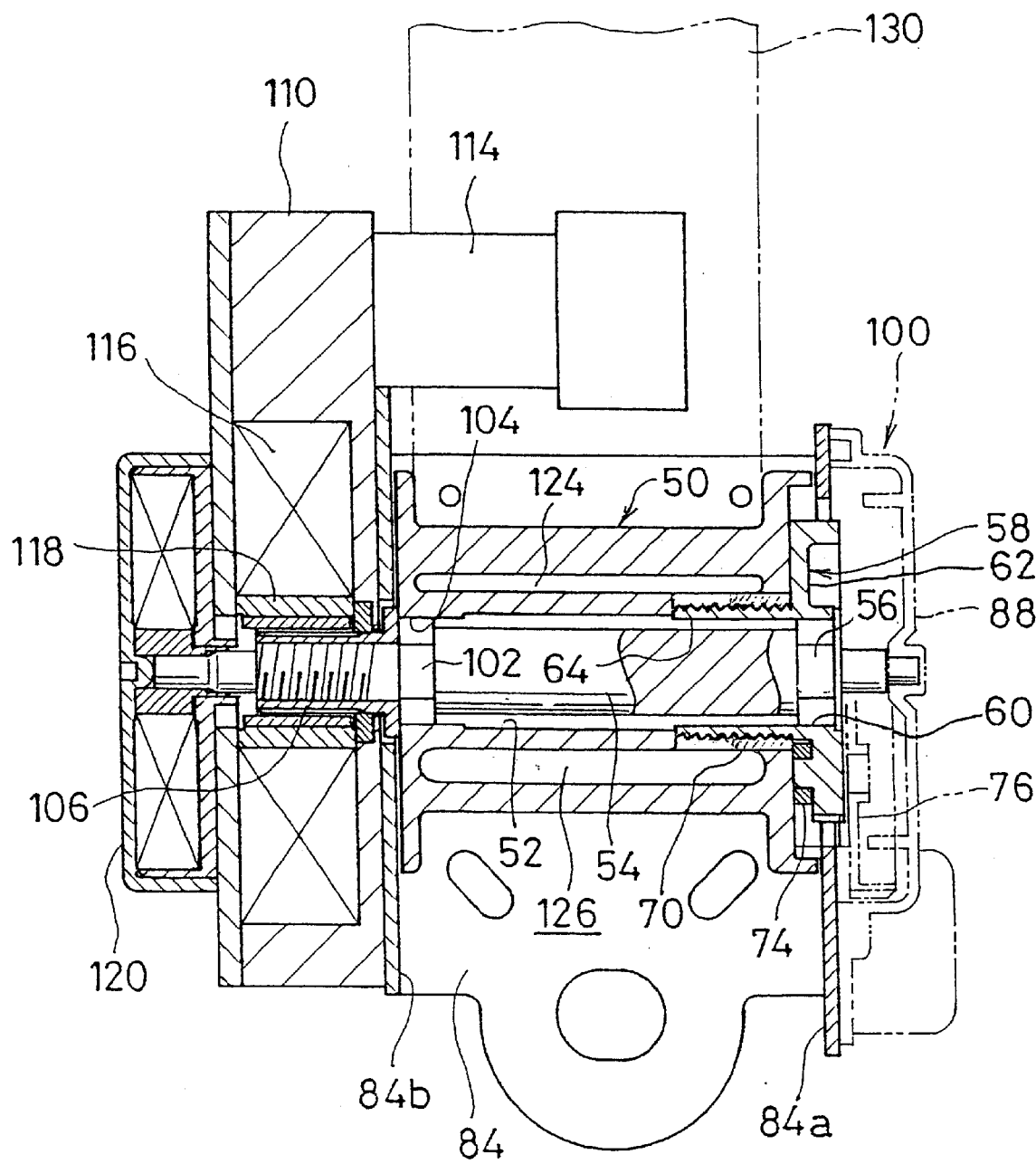
FIG. 3 is a vertical sectional view of the seat belt retractor of FIG. 2 in its operating state.
Figure 4:
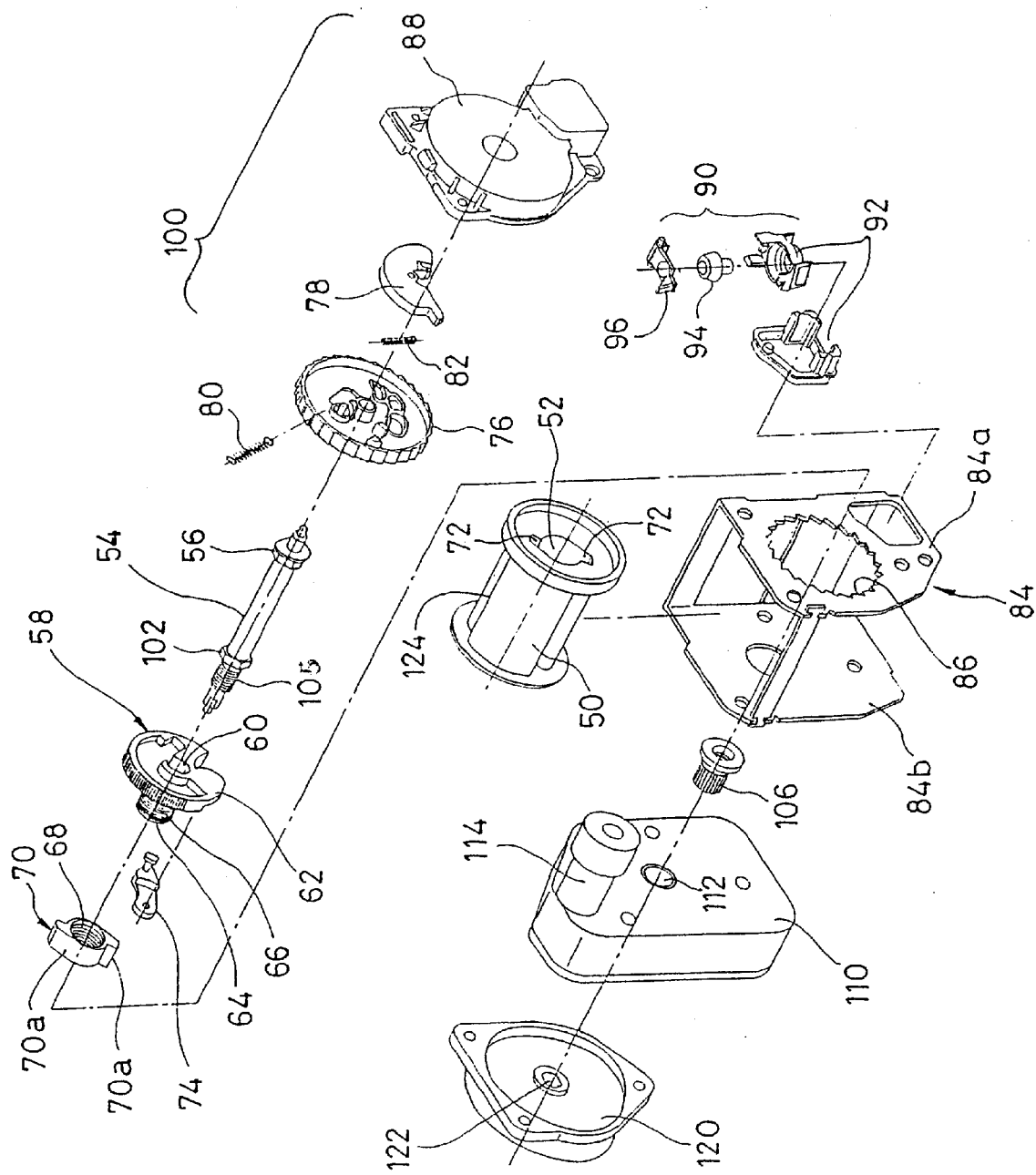
FIG. 4 is an exploded perspective view of the seat belt retractor according to the embodiment.
Figure 5:
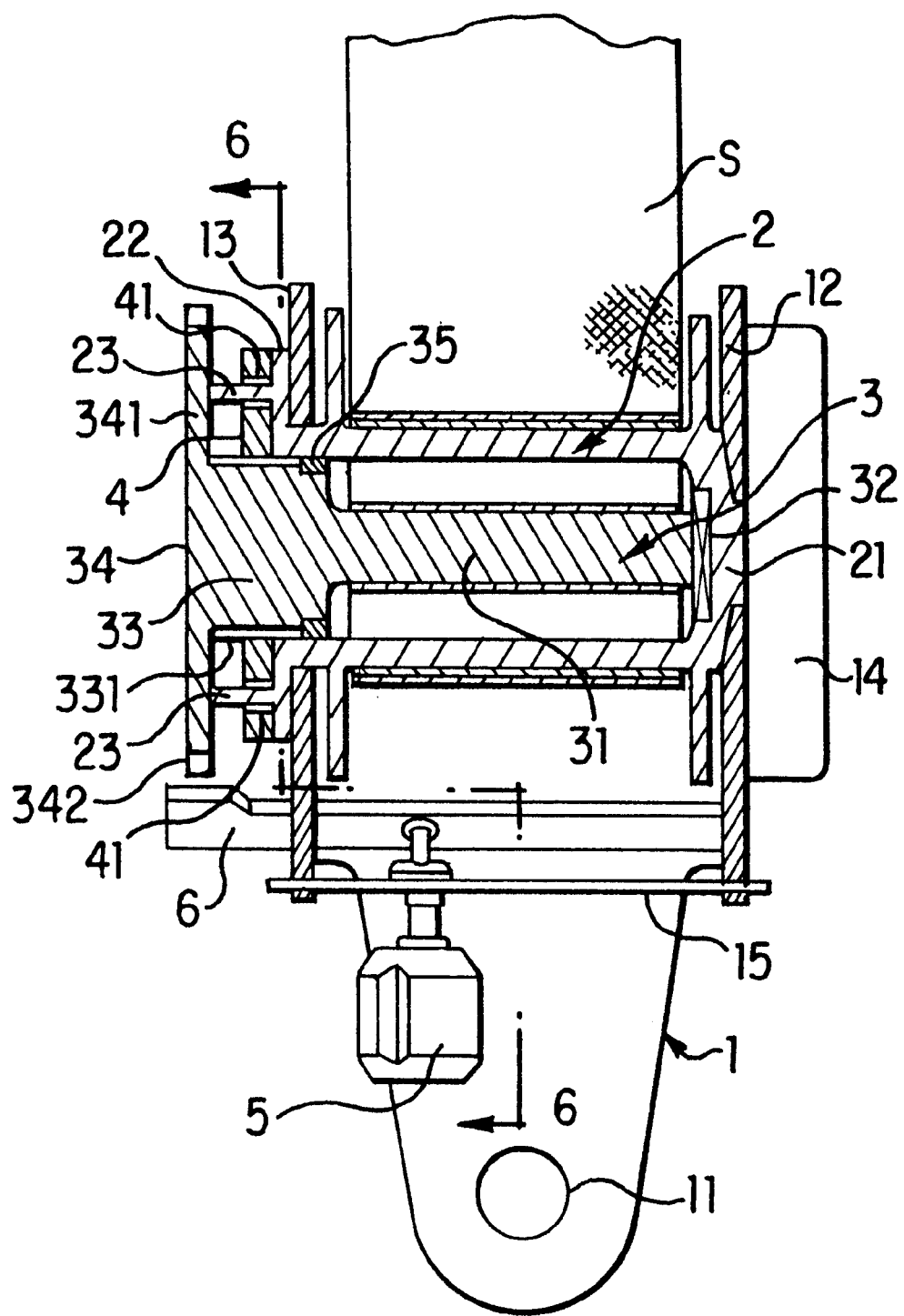
FIG. 5 is a vertical sectional view of a conventional seat belt retractor.
Figure 6:
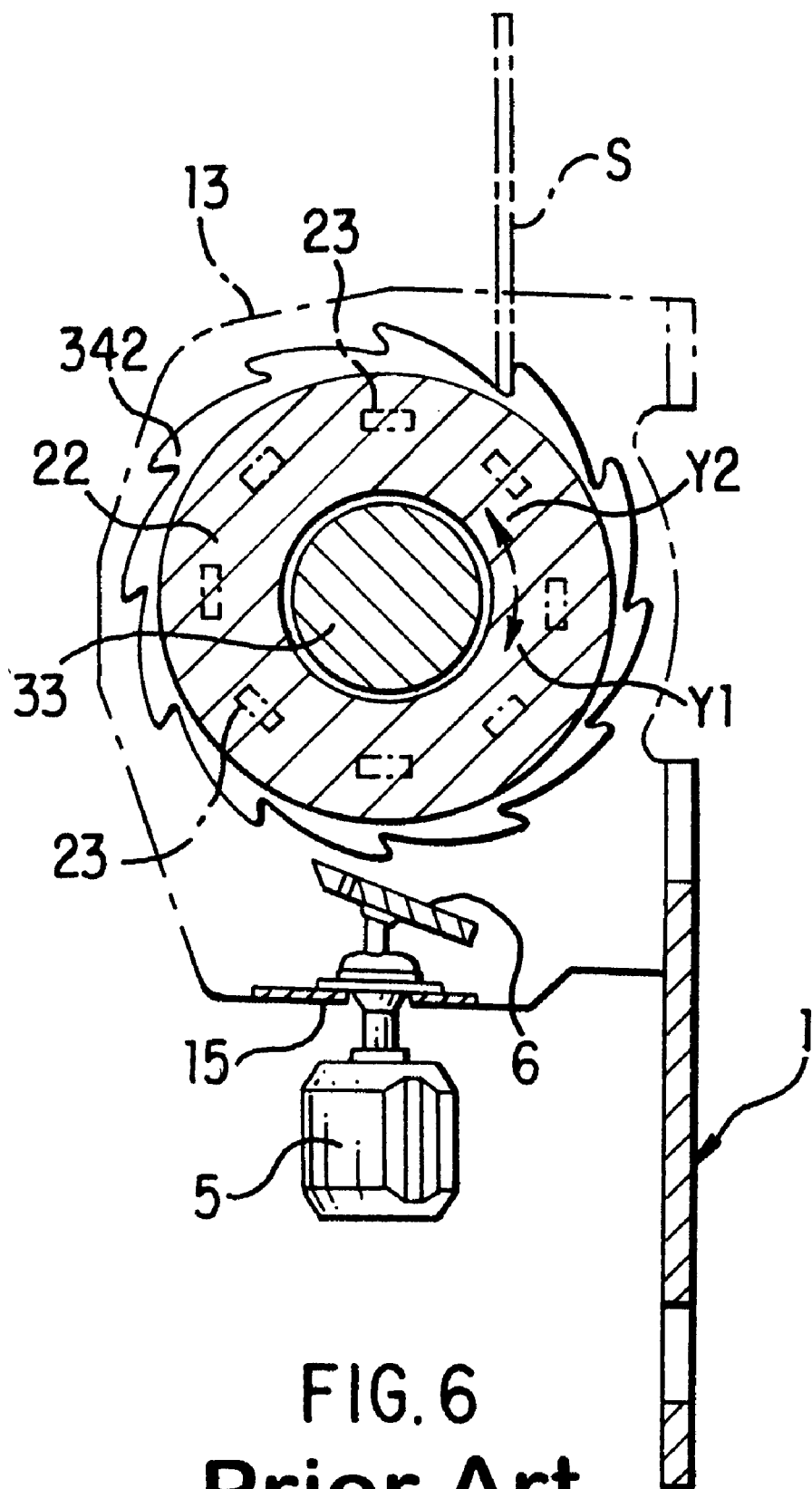
FIG. 6 is a sectional view along the line 6—6 in FIG. 5.
Figure 7:
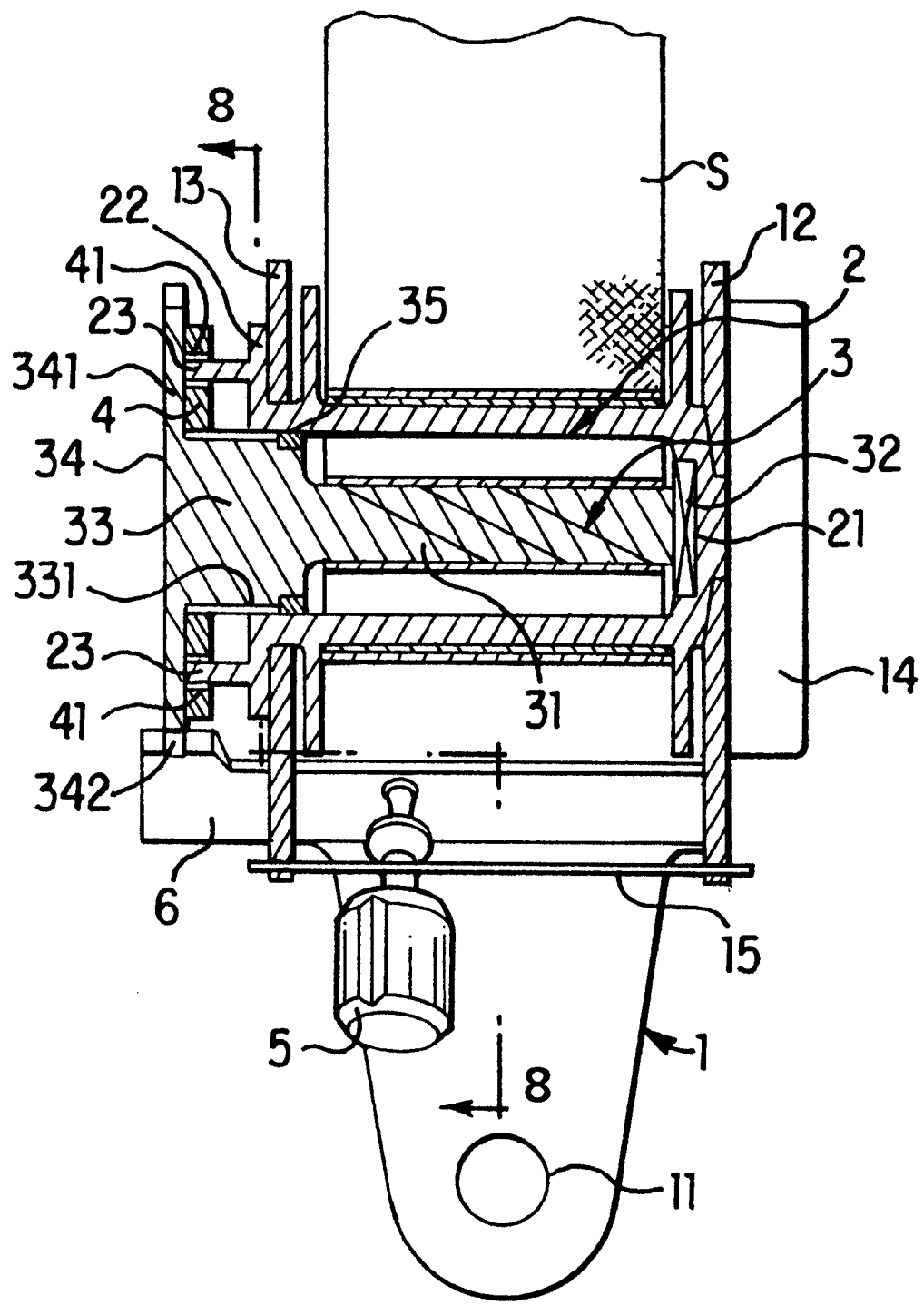
FIG. 7 is a vertical sectional view of the seat belt retractor of FIG. 5 in its operating state.
Figure 8:
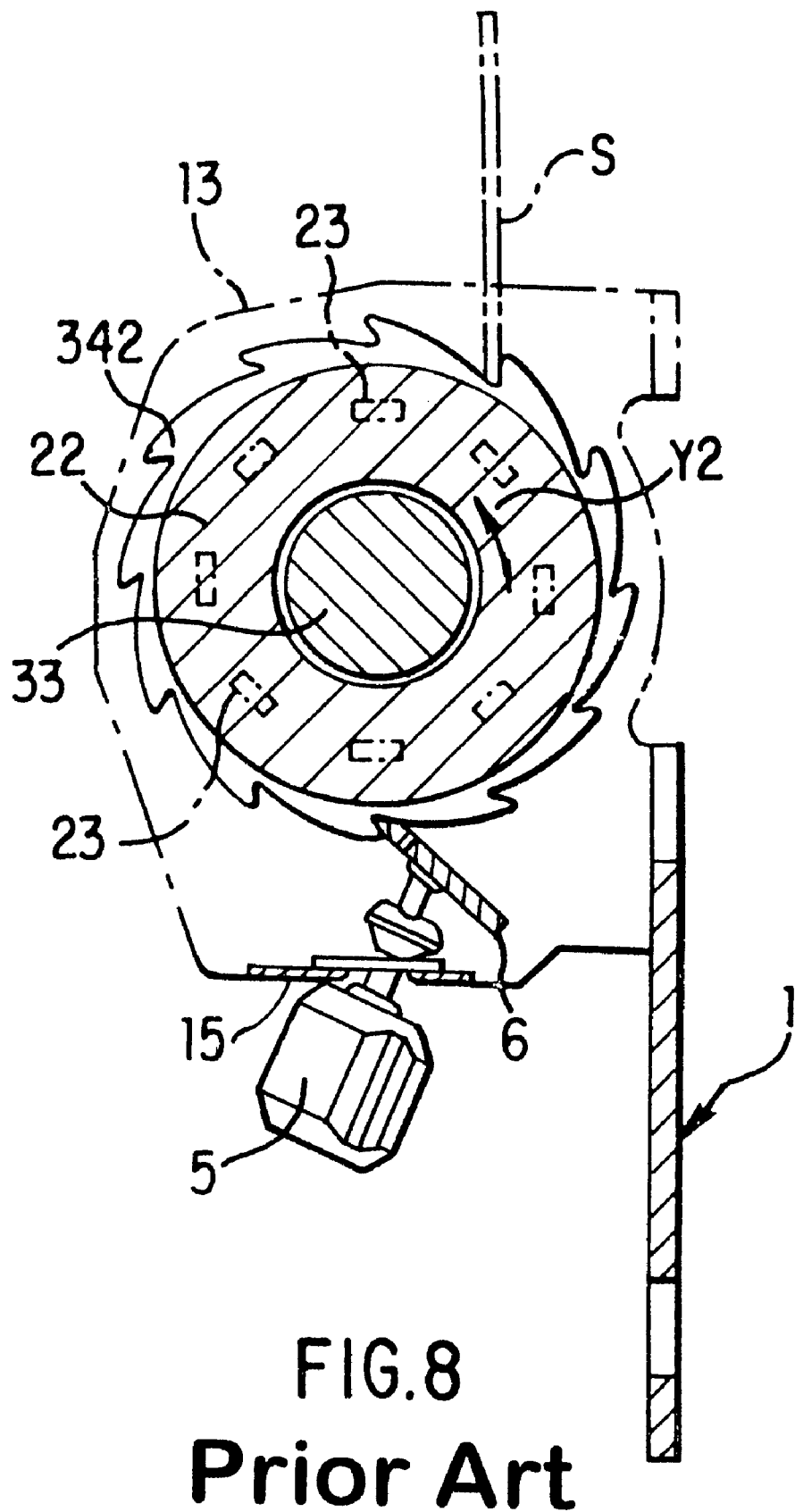
FIG. 8 is a sectional view along the line 8—8 in FIG. 7.

Embodiments of the present invention will now be described with reference to the drawings. FIG. 1a and FIG. 1b show a spool according to an embodiment of the present invention. FIG. 1a is a perspective view and FIG. 1b is a sectional view along the line 1b—1b in FIG. 1a. FIG. 2 is a vertical sectional view of a seat belt retractor having the spool, and FIG. 3 is a vertical sectional view of the seat belt retractor in its operative state. FIG. 4 is an exploded perspective view of the seat belt retractor.

A spool 50 is of cylindrical shape having an inner hole 52 (FIG. 4) in which a torsion bar 54 is inserted. One end of the torsion bar 54 is formed as the first hexagonal region 56 which engages a hexagonal hole 60 formed in an inner hole of a pawl holder 58. The pawl holder 58 has a flange 62 and a column 64 protruding from a flange 62, and the hexagonal hole 60 penetrates both of the flange 62 and the column 64. A male thread 66 is formed in the outer periphery of the column 64.

A stopper member 70 having a female thread 68 is fixed to the column 64 by screwing the female thread onto the male thread 66. The stopper member 70 has a pair of projections 70a projecting in the radial direction which engage recesses 72 provided in the inner hole 52 of the spool 50.

A pawl 74 is journaled to the flange 62 of the pawl holder 58. A lock ring 76 is arranged coaxially with the torsion bar 54 at the front side of the flange 62 of the pawl holder 58. The parts including a lock starter 78, and springs 80, 82 are installed on the lock ring 76. These parts cause the pawl 74 to protrude outward further than the outer periphery of the flange 62 in the case of the collision of the vehicle or the rapid rotation of the spool 50 in such a manner that the pawl 74 engages one of the inner teeth of a toothed opening 86 of a frame 84. In addition, the frame 84 has a pair of frame sides 84a and 84b between which the spool 50 is disposed.

The lock ring 76 is covered with a cover 88. A lock activating mechanism 90 is supported by the frame 84 and is also covered with the cover 88.

The lock activating mechanism 90 has a weight 94 which is supported by a holder 92 in such a manner that it can tilt, and a lever 96 which is journaled to the holder 92 and overlaid onto the weight 94. When the vehicle generates acceleration exceeding a predetermined value, the weight 94 tilts to pop up the lever 96. The tip of the lever 96 engages one of the teeth in the outer periphery of the lock ring 76, thus being an unrotatable state of the lock ring 76. This causes the pawl 74 to protrude from the outer periphery of the flange 62, bringing the pawl 74 into engagement with the toothed opening 86 of the frame 84. The structure of a locking mechanism 100 described above is well known.

The torsion bar 54 is provided with a second hexagonal region 102 at the end opposite to the end at which the hexagonal region 56 is arranged. The second hexagonal region 102 engages a hexagonal region 104 (FIG. 2, FIG. 3) formed in the inner hole 52 of the spool 50.

As mentioned above, the spool 50 having the torsion bar 54 is arranged between the frame sides 84a and 84b. Torsion bar 54 is provided with a reverse thread 105 at the region further toward the tip than the hexagonal region 102. A nut 106 having splines is screwed on the reverse thread 105. The nut 106 is inserted into an inner hole 112 of a pre-tensioner 110.

The function of the pre-tensioner 110 is to rotate the spool 50 in the webbing-winding direction for predetermined revolutions with large torque at the collision of the vehicle, thus eliminating the slack of the webbing. The pre-tensioner 110 is provided with a gas generator 114 which generates gas at the collision of the vehicle, a torque generation means 116 which generates torque using the gas generated by the gas generator 114, and a torque transmission means 118 which transmits the torque generated by the torque generation means 116 to the nut 106. In addition, the torque transmission means 118 is so constructed that it transmits the torque only from the torque generation means 116 to the nut 106, but not from the nut 106 to the torque generation means 116.

The tip of the torsion bar 54 penetrates the pre-tensioner 110 and is engaged with an inner hole 122 of a spiral spring unit 120. The spiral spring unit 120 is for biasing the spool 50 via the torsion bar 54 in the webbing-winding direction.

As shown clearly in FIG. 1b, the spool 50 is provided with a first slit 124 and a second slit 126 which extend along the chord direction in the cross section perpendicular to the axis of the spool 50. The end of a webbing 130 is passed through these slits 124 and 126 in series. The end part of the webbing 130 is folded back and the folded part is sewn together to form a loop. In the loop made by folding and sewing, a webbing stopper 132 is inserted. The webbing stopper 132 engages the inlet of the second slit 126 and prevents webbing 130 from falling out.

In addition, as shown in FIG. 1b, the first slit 124 and the second slit 126 extend in parallel with each other.

Now, the operation of the seat belt retractor will be described. When the vehicle is in the normal state, the stopper member 70 is located apart from the flange 62 of the pawl holder 58, as shown in FIG. 2. In this state, the locking mechanism 100 and the pre-tensioner 110 are not in operation and the spool 50 is biased by the spiral spring unit 120 in the webbing-winding direction. When the webbing 130 is unwound, the spool 50 rotate in the webbing-unwinding direction against the biasing force of the spiral spring unit 120.

When the vehicle comes into collision, the pre-tensioner 110 operates and exerts large torque to the torsion bar 54 in the webbing-winding direction. The torque rotates the spool 50 via the hexagonal region 102 of the torsion bar 54 and the hexagonal region 104 of the spool 50 and winds up the webbing 130 for a predetermined length.

Concurrently when the vehicle comes into collision, the weight 94 of the lock activating mechanism 90 tilts to cause that the lock ring 76 engages the lever 96 of the lock activating mechanism 90. This causes pawl 74 to protrude from the outer periphery of the flange 62 to be engaged with the toothed opening 86. Thus, the pawl holder 58 is prevented from rotating in the webbing-unwinding direction.

When the vehicle comes into collision, the body of the occupant moves forward by inertia and the webbing 130 is tensioned strongly in the webbing-unwinding direction. As the hexagonal region 104 of the spool 50 is engaged with the hexagonal region 102 of the torsion bar 54 as mentioned above, when the pawl holder 58 is brought into unrotatable state in the webbing-unwinding direction, the torsion bar 54 is twisted between the two hexagonal regions 104 and 102. Thus, the spool 50 rotates in the webbing-unwinding direction while twisting the torsion bar 54, and the impact delivered to the occupant is absorbed by the twisting of the torsion bar 54.

When the spool 50 rotates in the webbing-unwinding direction while the pawl holder 58 is engaged with the frame 84 in an unrotatable state, the stopper member 70, which is unified with the spool 50 by the engagement between the recesses 72 and the projections 70a, rotates together with the spool 50. As the female thread 68 of the stopper member 70 is screwed to the male thread 66 of the pawl holder 58, the stopper member 70 is driven toward the flange 62 of the pawl holder 58 by the rotation of itself in the webbing-unwinding direction accompanied by the rotation of the spool 50, until the stopper member 70 comes in contact with the back face of the flange 62 (FIG. 3).

In this way, the further rotation of the stopper member 70 and consequently, the further rotation of the spool 50 is prevented. That is, the spool 50 is allowed to rotate while the stopper member 70 moves from the location in the state of FIG. 2 to the location of the state of FIG. 3, and the further rotation in the webbing-unwinding direction is prevented. Thus, the maximum torsional revolution of the torsion bar 54 is regulated and the torsion bar 54 is protected from breaking.

According to the embodiment, as the stopper member 70 is arranged in the inner hole 52 of the spool 50, the protrusion outside of the frame 84 (toward the right in FIG. 2 and FIG. 3) is smaller as compared with the conventional example of FIG. 5 through FIG. 8 in which the stopper member is arranged outside of the frame. As the result, the seat belt retractor can be made more compact as compared with the conventional example.

In addition, in the state in which the stopper member 70 comes in contact with the flange 62 as shown in FIG. 3, the torque in the webbing-winding direction of the webbing 130 exerted to the spool 50 is transmitted to the pawl holder 58 via the spool 50 and the column 64. The connection between the spool 50 and the stopper 70 is sufficiently strong to stand the large torque because of the engagement of the projections 70a projecting radially from the stopper member 70 with the recesses 72 of the spool 50. Likewise, sufficiently large torque can be transmitted between the spool 50 and the stopper member 70, because the stopper member 70 is directly pressed against the pawl holder 58 by the engagement of the female thread 68 of the stopper member 70 with the male thread 66 of the pawl holder 58. Accordingly, the spool 50 is supported firmly to the frame side 84a even if very large unwinding force is applied to the webbing 130.

Figure 9:
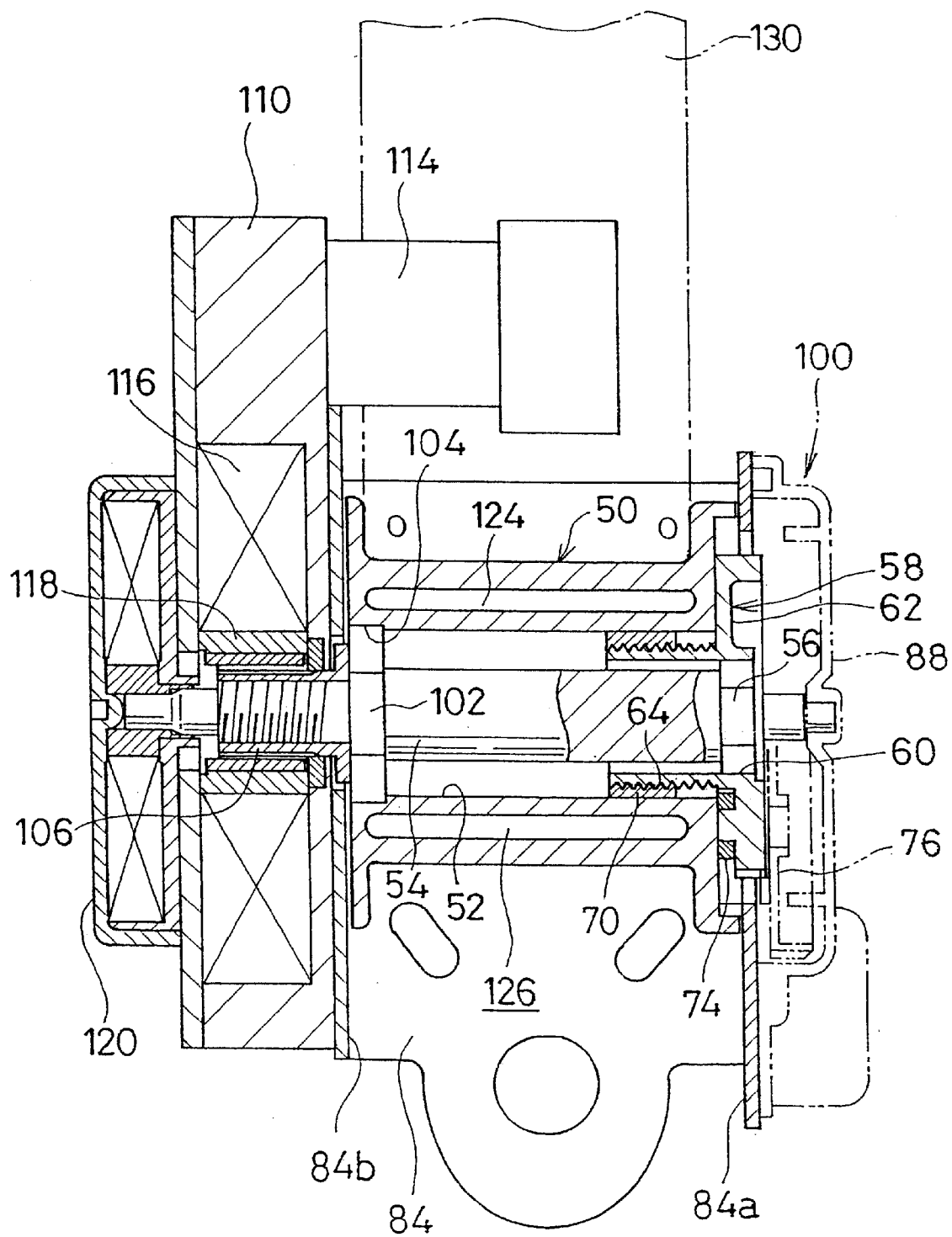
FIG. 9 is a vertical sectional view of a seat belt retractor according to another embodiment.

FIG. 9 is the sectional view of a seat belt retractor according to another embodiment showing the state corresponding to the state of FIG. 2. According to this embodiment, the inner hole 52 of the spool 50 has the equal inner diameter throughout except hexagonal region 104 at the left end side in the figure. In the embodiment of FIG. 1 through FIG. 4, as shown in FIG. 2 and FIG. 3, the portion of the inner hole 52 surrounding the column 64 has a larger diameter than the portion toward the left, forming a step at the boundary of the larger diameter portion at the right and smaller diameter portion at the left, and the stopper member 70 can rest against the step as shown in FIG. 2.

In contrast to this, the inner hole 52 shown in FIG. 9 has an equal diameter throughout, except the hexagonal region 104, and the step does not exist.

The other structure of the seat belt retractor of FIG. 9 is similar to the seat belt retractor of FIG. 1 through FIG. 4 and the same reference numerals designate the same parts.

Figure 10:
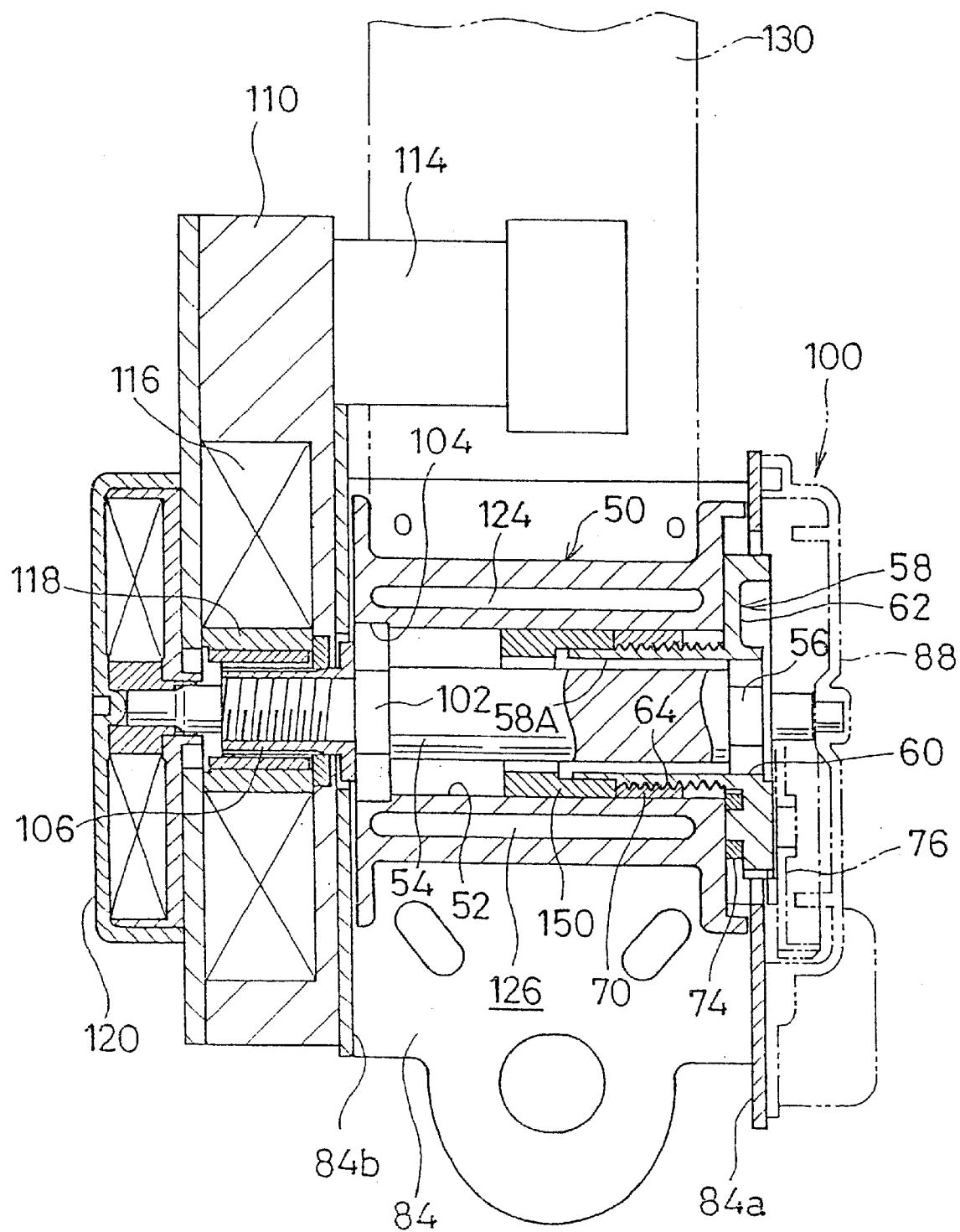
FIG. 10 is a vertical sectional view of a seat belt retractor according to a further embodiment.

FIG. 10 is a sectional view of a seat belt retractor according to a further embodiment of the present invention, showing a state corresponding to the state of FIG. 9.

Also in this embodiment, the inner hole 52 has an equal diameter throughout, except the hexagonal region 104.

According to this embodiment, a cylindrical portion 58A is formed at the tip of the column 64 coaxially with the column 64, and a bush 150 is fitted to the cylindrical portion 58A. This bush 150 contacts the inner surface of the inner hole 52 in such a manner that it can slide freely. The bush 150 secures the coaxial locative relations of the torsion bar 54, the pawl holder 58 and the spool 50. The other structure of the retractor of FIG. 10 is the same as that of the seat belt retractor of FIG. 1 through FIG. 4 and the same reference numerals designate the same parts.

The operation of the seat belt retractors of FIG. 9 and FIG. 10 is the same as that of the seat belt retractor of FIG. 1 through FIG. 4. When the vehicle is in the normal state, the stopper member 70 is located at the left end of the male thread part 66 of the column 64, apart from the flange 62 of the pawl holder 58, as shown in FIG. 9 and FIG. 10. In this state, the locking mechanism 100 and the pre-tensioner 110 are not in operation and the spool 50 is biased by the spiral spring unit 120 in the webbing-winding direction. When the webbing 130 is unwound, the spool 50 rotates in the webbing-unwinding direction against the biasing force of the spiral spring unit 120.

When the vehicle comes into collision, the pre-tensioner 110 operates and exerts large torque to the torsion bar 54 in the webbing-winding direction. The torque rotates the spool 50 via the hexagonal region 102 of the torsion bar 54 and the hexagonal region 104 of the spool 50 and winds up the webbing 130 for a predetermined length.

Concurrently when the vehicle comes into collision, the weight 94 of the lock activating mechanism 90 tilts to cause that the lock ring 76 engages the lever 96 of the lock activating mechanism 90. This causes pawl 74 to protrude from the outer periphery of the flange 62 to be engaged with the toothed opening 86. Thus, the pawl holder 58 is prevented from rotating in the webbing-unwinding direction.

When the vehicle comes into collision, the body of the occupant moves forward by inertia and the webbing 130 is tensioned strongly in the webbingunwinding direction. As the hexagonal region 104 of the spool 50 is engaged with the hexagonal region 102 of the torsion bar 54 as mentioned above, when the pawl holder 58 is brought into unrotatable state in the webbing-unwinding direction, the torsion bar 54 is twisted between the two hexagonal region 104 and 102. Thus, the spool 50 rotates in the webbing-unwinding direction while twisting the torsion bar 54, and the impact delivered to the occupant is absorbed by the twisting of the torsion bar 54.

When the spool 50 rotates in the webbing-unwinding direction while the pawl holder is engaged with the frame 84 in an unrotatable state, the stopper member 70, which is unified with the spool 50 by the engagement between the recesses 72 and the projections 70a, rotates together with the spool 50. As the female thread 68 of the stopper member 70 is screwed to the male thread 66 of the pawl holder 58, the stopper member 70 is driven toward the flange 62 of the pawl holder 58 by the rotation of itself in the webbing-unwinding direction accompanied by the rotation of the spool 50, and after that, the stopper member 70 comes in contact with the back face of the flange 62 (in the same manner as described with reference to FIG. 3).

In this way, the further rotation of the stopper member 70 and consequently, the further rotation of the spool 50 is prevented. That is, the spool 50 is allowed to rotate while the stopper member 70 moves from the state of FIG. 9 or FIG. 10 until coming in contact with the flange 62, and the further rotation in the webbing-unwinding direction is prevented. Thus, the maximum torsional revolution of the torsion bar 54 is regulated and the torsion bar 54 is protected from breaking.

In addition, also in the seat belt retractor of FIG. 9 and FIG. 10, the stopper member 70 is arranged in the inner hole 52 of the spool 50. Accordingly, the protrusion outside of the frame 84 is small, making the seat belt retractor more compact.

Figure 11:
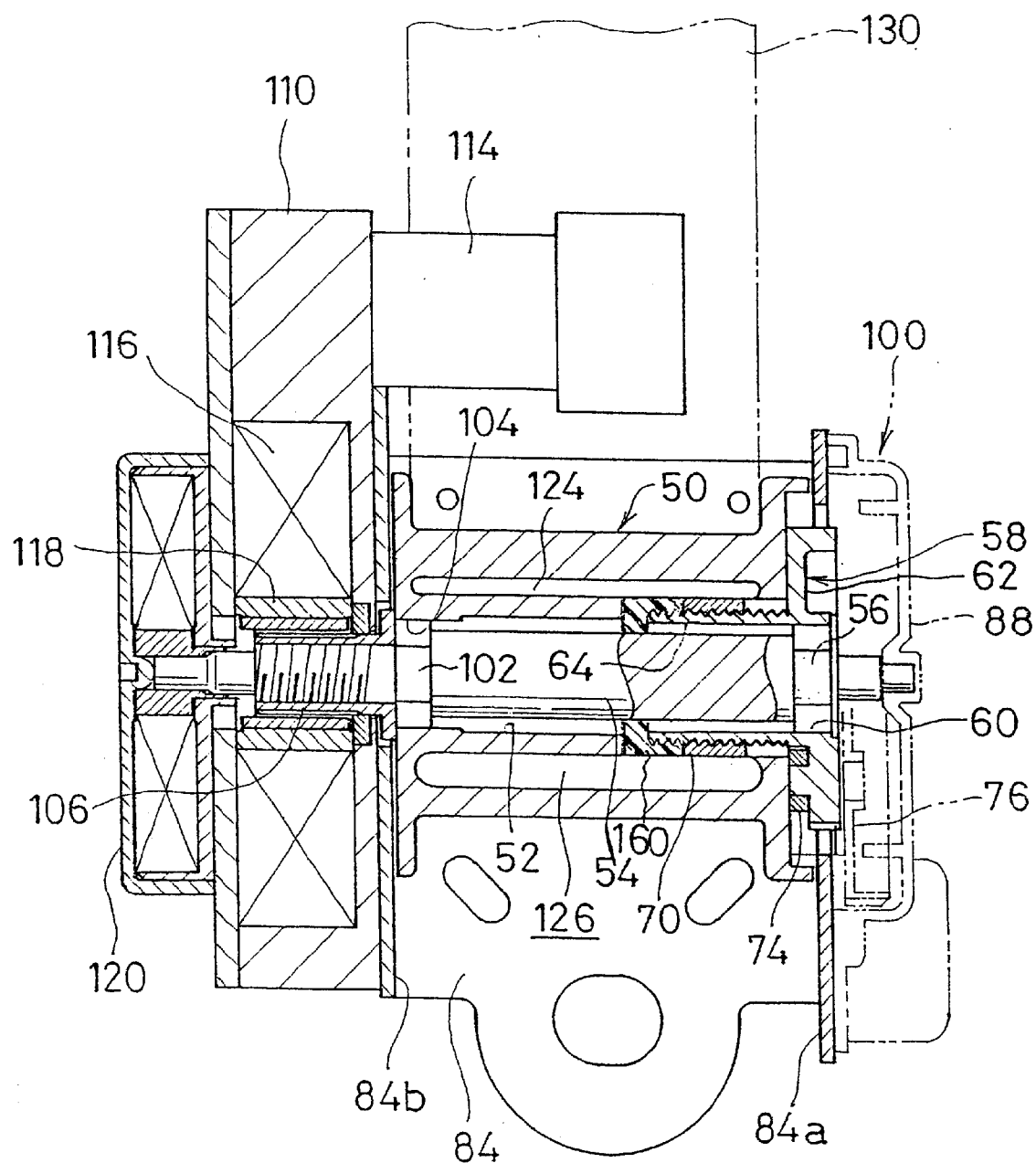
FIG. 11 is a vertical sectional view of a seat belt retractor according to a different embodiment.

In a seat belt retractor of the present invention, a ring 160 made of synthetic resin or rubber can be interposed between the outer periphery of the tip portion of the column 64 and the inner hole 52 of the spool 50, as shown in FIG. 11 in order to prevent the noise generation caused by the vibration of the column 64. The other structure of the retractor of FIG. 11 is the same as that of the seat belt retractor of FIG. 2 and the same reference numerals designate the same parts.

In the embodiments mentioned above, two slits 124, 126 are formed in the spool 50 but three or more slits may be formed. However, in the seat belt retractor of ordinary size, it is preferable to form two slits 124, 125 as shown in FIG. 1. In addition, it is preferable to arrange the slits 124, 126 in parallel in order to average the stress delivered to the spool 50.

In the embodiments mentioned above, the pre-tensioner 110 is employed. However, the present invention can be applied also to a seat belt retractor without the pre-tensioner. In addition, the spool of the present invention can be applied to the conventional seat belt retractors shown in FIG. 5 through FIG. 8.

As mentioned above, according to the present invention, the webbing can be fixed firmly onto the spool with easy fixing work.

According to the present invention, the seat belt retractor can be made compact by arranging the stopper member within the inner hole of the spool.

What is claimed is:

1. A spool for a seat belt retractor for winding a webbing comprising a cylindrical portion provided with an inner hole into which a torsion bar is inserted, wherein said cylindrical portion is provided with a plurality of slits extending along a chord direction in the cross section perpendicular to the axis of said cylindrical portion so that the webbing is fixed to said spool by passing an end of the webbing through said slits.

2. A spool according to claim 1, wherein the number of said slits is two and said slits are disposed in parallel with each other in said section.

3. A seat belt retractor having a torsion bar connected to a spool so that impact exerted to an occupant is absorbed, wherein said spool has a cylindrical portion provided with an inner hole into which said torsion bar is inserted, and wherein said cylindrical portion is provided with a plurality of slits extending along a chord direction in the cross section perpendicular to the axis of said cylindrical portion so that the webbing is fixed to said spool by passing an end of the webbing through said slits.

4. A seat belt retractor according to claim 3, wherein the number of said slits is two and said slits are disposed in parallel with each other in said section.

5. A seat belt retractor comprising a cylindrical spool for winding a webbing, a frame supporting said spool, a torsion bar which is inserted into an inner hole of said spool and fixed to said spool at one end thereof, and a locking means for locking the other end of said torsion bar when acceleration exceeding a predetermined value is sensed, said torsion bar being capable of twisting when tensile force exceeding a predetermined value is exerted to the webbing at a state in which said locking means has locked said other end of the torsion bar, wherein said locking means comprises a pawl holder which is locked to said frame when the acceleration exceeding the predetermined value is sensed, a column which projects from said pawl holder and is inserted into the inner hole of said spool, a male thread which is formed in the outer surface of said column, a stopper member having a female thread formed in the inner surface thereof which is screwed on said male thread, said stopper member being slidable back and forth in axial direction along said column, a plurality of projections which project from said stopper member in the direction including the radial direction, and recesses which are formed in the inner hole of said spool and with which said projections are engaged; and wherein said stopper member is driven toward said pawl holder when said locking means has operated and the torsion bar twists by the tensile force exceeding the predetermined value exerted to the webbing and, after that, the stopper member comes in contact with the pawl holder, thereby transmitting the torque of the spool to the pawl holder via said stopper member and stopping the further rotation of the spool.

6. A seat belt retractor according to claim 5, wherein said spool has a cylindrical portion provided with said inner hole and that said cylindrical portion is provided with a plurality of slits extending along a chord direction in the cross section perpendicular to the axis of said cylindrical portion so that the webbing is fixed to said spool by passing an end of the webbing through said slits.

7. A seat belt retractor according to claim 6, wherein the number of said slits is two and said slits are disposed in parallel with each other in said section.

* * * * *